3,053,839
5α-HALO-ESTRAN-10β,17β-DIOL-3-ONE AND IN-
TERMEDIATES AND PROCESS THEREFOR
Jose Iriarte, Carl Djerassi, and Fred Allan Kincl, all of
Mexico City, Mexico, assignors, by mesne assignments,
to Syntex Corporation, a corporation of Panama
No Drawing. Filed Mar. 18, 1959, Ser. No. 800,085
Claims priority, application Mexico Mar. 19, 1958
12 Claims. (Cl. 260—239.55)

The present invention relates to novel cyclopentanophenanthrene derivatives and to a method for the preparation thereof.

More particularly, it relates to a estrane-10β,17β-diol-3-one halogenated at C-5α with fluorine, chlorine or bromine, as well as to their analogs substituted at C-17α with a residue of a lower aliphatic hydrocarbon, saturated or unsaturated. The novel compounds of the present invention are anabolic drugs exhibiting a favorable anabolic-androgenic ratio, and furthermore, show anti-estrogenic effect.

The novel compounds of the present invention and novel intermediates are illustrated by the following formulas:

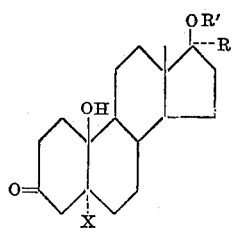

and

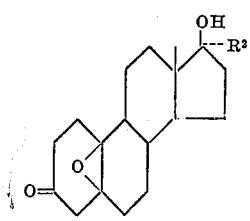

In the above formulas R represents hydrogen or a lower alkyl of less than seven carbon atoms, or lower alkinyl or lower alkenyl. $R^1$ represents hydrogen or when R is hydrogen, $R^1$ represents hydrogen or a hydrocarbon carboxylic acyl group of up to 12 carbon atoms, substituted conventionally or unsubstituted, straight or branched chain aliphatic, cyclic or mixed cyclic-aliphatic. Typical are acetate, propionate, cyclopentylpropionate, benzoate etc. $R^2$ represents lower alkyl or lower alkinyl. X represents fluorine, chlorine or bromine.

The novel compounds are prepared by a process illustrated as follows:

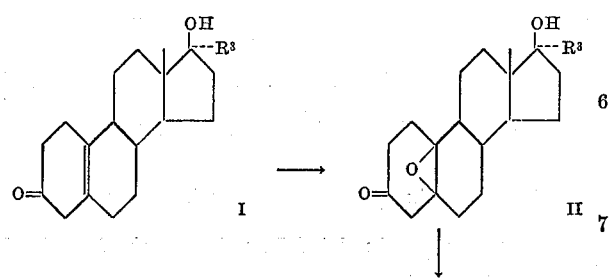

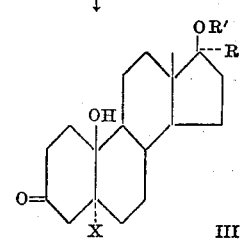

In the above equation X, $R^1$ and R represent the same groups as heretofore. $R^3$ represents hydrogen, lower alkyl or lower alkinyl.

In practicing the process above outlined, the nuclear double bond of the respective $\Delta^{5(10)}$-estren-17β-ol-3-one of Formula I was epoxidized by reaction with a peracid, which reaction has already been described in the case of the $\Delta^{5(10)}$-estren-17β-ol-3-one without substituent at C-17α. The epoxide ring of the resulting 5β,10β-oxido compounds of Formula II was opened by reaction with a hydrogen halide to produce the halohydrins of Formula III ($R^1$=H). For the reaction with hydrogen fluoride we preferably employed boron trifluoride and thus produced the corresponding fluorohydrins; the chlorohydrins were obtained by reaction with pyridine hydrochloride in mixture with a solvent inert to this reaction, such as ethanol; the bromohydrins were produced by reaction with concentrated aqueous hydrobromic acid in acetone solution.

The substituent at C-17α of the starting compounds, and therefore also of the intermediate oxido-compound and of the halohydrins obtained thereof, may be a lower alkyl or alkinyl group, such as methyl, ethyl propyl, butyl, ethinyl, propinyl or butinyl. For preparing the halohydrins having at C-17α an alkenyl substituent, such as vinyl, propenyl or butenyl, we hydrogenated partially the triple bond of the corresponding 17α-alkinyl-halohydrins.

Furthermore, the secondary hydroxyl group at C-17β of the halohydrins without the substituent at C-17α was esterified by reaction with the anhydride of a hydrocarbon carboxylic acid of up to 12 carbon atoms to produce the corresponding 17-esters (III; R=H, $R^1$=acyl). The anhydride may be derived from a saturated or unsaturated acid, of straight or branched chain, cyclic or mixed cyclic-aliphatic, substituted or not with methoxy, halogen or other groups and the esters formed include such as the acetate, propionate, butyrate, hemisuccinate, enanthate, caproate, benzoate, trimethylacetate, cyclopentylpropionate, phenylpropionate, phenoxyacetate and β-chloropropionate.

The following specific examples serve to illustrate but are not intended to limit the present invention.

*Example I*

A mixture of 400 mg. of $\Delta^{5(10)}$-estren-17β-ol-3-one and 10 cc. of chloroform was treated with a 0.44 N solution of monoperphthalic acid in ether, at the temperature of a mixture of Dry Ice and acetone for 2 hours and then for 18 hours at 10° C. After pouring into water, the product was extracted with ether, washed with sodium bicarbonate solution and water, dried over sodium sulfate and evaporated to dryness. Crystallization of the residue from acetone-hexane yielded 5β,10β-oxido-estran-17β-ol-3-one, M.P. 208–210° C., $[\alpha]_D$ −43° (chloroform), λ max. 3500 and 1713 cm.$^{-1}$.

*Example II*

A solution of 250 mg. of the above compound in a mixture of 30 cc. of anhydrous benzene and 15 cc. of absolute ether was treated with 0.5 cc. of boron trifluoride etherate and the mixture was kept standing at room temperature for 3 hours. It was then poured into water, extracted with ether and the extract was washed with water to neutral, dried over anhydrous sodium sulfate and evaporated. The residue crystallized from acetone-hexane to produce 5α-fluoro-estrane-10β,17β-diol-3-one, M.P. 215–217° C., [α]$_D$ −41° (chloroform).

*Example III*

A solution of 200 mg. of 5β,10β-oxido-estran-17β-ol-3-one and 200 mg. of pyridine hydrochloride in 20 cc. of absolute ethanol was heated under reflux for 3 hours. It was then poured into water and extracted with ethyl acetate; the extract was washed with water to neutral, dried over anhydrous sodium sulfate and the solvent was evaporated. Crystallization of the residue from methanol-benzene afforded 5α-chloro-estrane-10β,17β-diol-3-one with M.P. 187–189° C., [α]$_D$ +21° (methanol).

*Example IV*

To a mixture of 200 mg. of 5β,10β-oxido-estran-17β-ol-3-one and 10 cc. of acetone there was added 0.5 cc. of aqueous concentrated hydrobromic acid and the mixture was kept standing for 3 hours. It was then diluted with water and the precipitate formed was collected by filtration, washed with water, dried in vacuum and crystallized from acetone-hexane. There was thus obtained 5α-bromo-estrane-10β,17β-diol-3-one.

*Example V*

Following the same method as that described in Example I, 17α-ethinyl-Δ$^{5(10)}$-estren-17β-ol-3-one was converted into 17α-ethinyl-5β,10β-oxido-estran-17β-ol-3-one with M.P. 185–187° C., [α]$_D$ −75° (methanol); λ max. 234–6 mμ, log E 2.13, ν max. (KBr): 3500, 3280 and 1710 cm.$^{-1}$.

By the aforementioned reaction with boron trifluoride, as described in Example II, there was then obtained 17α-ethinyl-5α-fluoro-estrane-10β,17β-diol-3-one; M.P. 247–249° C. (crystallized from methanol-benzene); [α]$_D$ −40° (methanol); λ max. 230–6 mμ, log E 2.21; ν max. (KBr) 3640, 3460 and 1710 cm.$^{-1}$.

To a suspension of 20 mg. of a pre-reduced 2% palladium on calcium carbonate catalyst in 5 cc. of pyridine there was added 200 mg. of 17α-ethinyl-5α-fluoro-estrane-10β,17β-diol-3-one and the mixture was hydrogenated until the absorption of hydrogen practically ceased, which occurred when the equivalent of 1 mol of hydrogen had been absorbed. The catalyst was removed by filtration, washing the filter with ethyl acetate, and the combined filtrate and washings was washed with dilute hydrochloric acid and water, dried over anhydrous sodium sulfate and the ethylacetate was evaporated to dryness. The residue was purified by recrystallization from acetone-hexane, thus furnishing 17α-vinyl-5α-fluoroestrane-10β,17β-diol-3-one.

*Example VI*

By following the methods described in the previous examples, there were prepared all of the other 17α-alkyl alkenyl, alkinyl)-analogs of 5α-halo (bromo, chloro and fluoro)-estrane-10β,17β-diol-3-one comprised in our invention including the methyl, ethyl, propyl, butyl, propinyl, butinyl, propenyl and butenyl compounds.

*Example VII*

A mixture of 1 g. of 5α-fluoro-estrane-10β,17β-diol-3-one, 10 cc. of pyridine and 1 cc. of acetic anhydride was kept overnight at around 0° C. and then poured into water. The mixture was heated on the steam bath for half an hour and extracted with ether. The extract was washed with dilute hydrochloric acid, 5% sodium carbonate solution and water, dried over anhydrous sodium sulfate and evaporated to dryness. Several recrystallizations of the residue from acetone-hexane yielded 5α-fluoro-estrane-10β,17β-diol-3-one 17-acetate.

*Example VIII*

By the same method there was acetylated the 17β-hydroxyl group of 5α-chloro-estrane-10β,17β-diol-3-one and of 5α-bromo-estrane-10β,17β-diol-3-one to produce the corresponding 17-acetates of such compounds.

*Example IX*

By substituting in the method of Examples VII and VIII for acetic anhydride, another anhydride of a hydrocarbon carboxylic acid having up to 12 carbon atoms, there were prepared the corresponding 17-esters of the 5α-halo-estrane-10β,17β-diol-3-ones including the caproates, cyclopentylpropionates and benzoates.

We claim:
1. A process for the production of 5α-halogen-estran-10β,17β-diol-3-one compounds comprising reacting a Δ$^{5(10)}$-estren-17β-ol-3-one compound with a peracid to form the corresponding 5β,10β-oxido compound and opening the oxido ring of the last mentioned compound with a hydrogen halide.

2. A compound of the following formula:

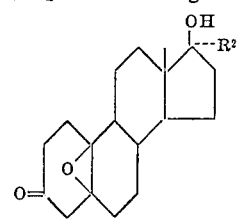

wherein R$^2$ is lower alkinyl.

3. 17α-ethinyl-5β,10β-oxido-estran-17β-ol-3-one.

4. A compound of the following formula:

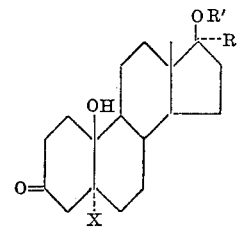

wherein R is selected from the group consisting of hydrogen, lower alkyl, lower alkenyl and lower alkinyl, X is selected from the group consisting of fluorine, bromine and chlorine, R$^1$ is selected from the group consisting of hydrogen and a hydrocarbon carboxylic acyl of up to 12 carbon atoms when R is hydrogen and R$^1$ is hydrogen when R is other than hydrogen.

5. 5α-fluoro-estran-10β,17β-diol-3-one.

6. The 17-hydrocarbon carboxylic acid esters of up to 12 carbon atoms of 5α-fluoro-estran-10β,17β-diol-3-one.

7. 5α-bromo-estran-10β,17β-diol-3-one.

8. The 17-hydrocarbon carboxylic acid esters of up to 12 carbon atoms of 5α-bromo-estran-10β,17β-diol-3-one.

9. 5α-chloro-estran-10β,17β-diol-3-one.

10. The 17-hydrocarbon carboxylic acid esters of up to 12 carbon atoms of 5α-chloro-estran-10β,17β-diol-3-one.

11. 17α-ethinyl-5α-fluoro-estrane-10β,17β-diol-3-one.

12. 17α-vinyl-5α-fluoro-estrane-10β,17β-diol-3-one.

References Cited in the file of this patent

UNITED STATES PATENTS

| | | |
|---|---|---|
| 2,729,654 | Colton | Jan. 3, 1956 |
| 2,806,862 | Pederson et al. | Sept. 17, 1957 |
| 2,838,503 | Herr et al. | June 10, 1958 |

OTHER REFERENCES

Ruelas et al.: J. Org. Chem., vol. 23, pp. 1744–47 (November 1958).

Nussbaum et al.: J.A.C.S., vol. 80, pp. 2722–2725 (June 5, 1958).